United States Patent
Stapleton (10) Patent No.: US 11,228,274 B2
(45) Date of Patent: Jan. 18, 2022

(54) PANEL MOUNTING BRACKET WITH GROUNDING MID-CLAMP AND RELATED METHODS

(71) Applicant: Kevin Stapleton, New Braunsfels, TX (US)

(72) Inventor: Kevin Stapleton, New Braunsfels, TX (US)

(*) Notice: Subject to any disclaimer, the term of this patent is extended or adjusted under 35 U.S.C. 154(b) by 0 days.

(21) Appl. No.: 16/851,247

(22) Filed: Apr. 17, 2020

(65) Prior Publication Data

US 2020/0244214 A1 Jul. 30, 2020

Related U.S. Application Data (63) Continuation of application No. 15/729,125, filed on Oct. 10, 2017, now Pat. No. 10,630,229.

(60) Provisional application No. 62/406,527, filed on Oct. 11, 2016.

(51) Int. Cl.
| | |
|---|---|
| *E04D 13/18* | (2018.01) |
| *H02S 20/23* | (2014.01) |
| *F24S 25/61* | (2018.01) |
| *F24S 25/636* | (2018.01) |
| *F24S 25/632* | (2018.01) |
| *F24S 25/00* | (2018.01) |

(52) U.S. Cl.
CPC ............ *H02S 20/23* (2014.12); *F24S 25/61* (2018.05); *F24S 25/632* (2018.05); *F24S 25/636* (2018.05); *F24S 2025/803* (2018.05); *Y02B 10/10* (2013.01); *Y02B 10/20* (2013.01); *Y02E 10/47* (2013.01)

(58) Field of Classification Search
None
See application file for complete search history.

(56) References Cited

U.S. PATENT DOCUMENTS

| | | | |
|---|---|---|---|
| 6,105,317 | A | 8/2000 | Tomiuchi et al. |
| 7,956,280 | B2 | 6/2011 | Kobayashi |
| 9,057,545 | B2 | 6/2015 | Stapleton |
| 9,145,685 | B2 | 9/2015 | Stapleton |
| 9,214,891 | B2 | 12/2015 | Dickey |
| 9,397,605 | B2 | 7/2016 | Stapleton |
| 9,484,853 | B2 | 11/2016 | Stapleton |
| 9,628,018 | B2 | 4/2017 | Stapleton |

(Continued)

FOREIGN PATENT DOCUMENTS

WO WO2012116223 8/2012

*Primary Examiner* — Basil S Katcheves
(74) *Attorney, Agent, or Firm* — Allen, Dyer, Doppelt + Gilchrist, PA (57) ABSTRACT

A system for mounting solar panels on a building may include panel mounting brackets each including a base to be positioned on the building and a vertical extension having a proximal end coupled to the base and a distal end vertically spaced apart from the base. The system may also include interior mounting clamps each including a leg having a proximal end to be coupled to the distal end of the vertical extension of a given panel mounting bracket and a distal end. Each interior mounting clamp may also include a first lateral arm for securing a first solar panel to the given panel mounting bracket, and a second lateral arm for securing a second solar panel to the given panel mounting bracket. The second lateral arm may have a bottom surface positioned vertically above a bottom surface of the first lateral arm along the leg.

15 Claims, 11 Drawing Sheets

(56) References Cited

U.S. PATENT DOCUMENTS

| | | | |
|---|---|---|---|
| 10,381,972 B2 | 8/2019 | Stapleton | |
| 10,630,229 B2 * | 4/2020 | Stapleton | F24S 25/632 |
| 2007/0295391 A1 | 12/2007 | Lenox et al. | |
| 2008/0066801 A1 | 3/2008 | Schwarze | |
| 2008/0302407 A1 | 12/2008 | Kobayashi | |
| 2009/0165843 A1 | 7/2009 | Horioka et al. | |
| 2010/0154784 A1 | 6/2010 | King et al. | |
| 2010/0276558 A1 | 11/2010 | Faust et al. | |
| 2011/0138585 A1 | 6/2011 | Kmita et al. | |
| 2011/0214365 A1 | 9/2011 | Aftanas | |
| 2012/0234378 A1 | 9/2012 | West et al. | |
| 2014/0109496 A1 | 4/2014 | Stapleton | |
| 2015/0113889 A1 | 4/2015 | Stapleton | |
| 2015/0171785 A1 | 6/2015 | Dickey | |

\* cited by examiner

PANEL MOUNTING BRACKET WITH GROUNDING MID-CLAMP AND RELATED METHODS

RELATED APPLICATIONS

This application is a continuation of application Ser. No. 15/729,125 filed Oct. 10, 2017 which claims the benefit of provisional application Ser. No. 62/406,527 filed Oct. 11, 2016, which are hereby incorporated herein by their entireties by reference.

TECHNICAL FIELD

The present disclosure generally relates to mounting fixtures, and, more particularly, to mounting fixtures for rooftop panel installations, such as for solar panels, for example.

BACKGROUND

Solar panels, such as photovoltaic (PV) and solar water heating panels, are frequently used to take advantage of electrical power generation and heating properties of sunlight. To provide space savings and potentially enhanced efficiency, solar panels are in many cases installed on rooftops of buildings (e.g., office buildings, houses, pavilions, free-standing structures with or without walls, etc.). However, because of winds and storms, the mounting fixtures used for installing solar panels on buildings need to be sufficiently strong and durable to reduce the chances of damage or injury from a panel coming loose during a storm, etc.

Various mounting fixtures have been developed for solar panel installation. For example, one particularly advantageous system for mounting a solar panel(s) on a building is disclosed in U.S. Pat. No. 9,628,018 to Stapleton, which is hereby incorporated herein in its entirety by reference. The system may include a plurality of panel mounting brackets each including a base to be positioned on the building, and a vertical extension having a proximal end coupled to the base and a distal end vertically spaced apart from the base, with the distal end defining a fastener channel therein. The system may also include a plurality of mounting clamps each including a bottom flange, and a top flange spaced apart from the bottom flange and partially overhanging the bottom flange and defining a slot therebetween to receive a lip of the solar panel. An end extension may couple respective ends of the bottom flange and top flange together, and a fastener channel connector may be coupled to the bottom flange and configured to be slidably received within the fastener channel. Other solar panel mounting fixtures and systems are disclosed in U.S. Pat. Nos. 9,484,853; 9,397,605; 9,145,685; and 9,057,545, also to Stapleton, all of which are hereby incorporated herein in their entireties by reference.

Despite the existence of such mounting fixtures, further enhancements may be desirable in some applications to help simplify and expedite the installation of solar panels on buildings or rooftops.

SUMMARY

A system for mounting a plurality of solar panels on a building may include a plurality of panel mounting brackets each including a base to be positioned on the building and a vertical extension having a proximal end coupled to the base and a distal end vertically spaced apart from the base. The system may also include a plurality of interior mounting clamps each including a leg having a proximal end to be coupled to the distal end of the vertical extension of a given panel mounting bracket and a distal end. Each interior mounting clamp may also include a first lateral arm coupled to the distal end of the leg on a first side thereof for securing a first solar panel to the given panel mounting bracket, the first lateral arm having a bottom surface, and a second lateral arm coupled to the distal end of the leg on a second side thereof opposite the first side for securing a second solar panel to the given panel mounting bracket, the second lateral arm having a bottom surface positioned vertically above the bottom surface of the first lateral arm along the leg.

Furthermore, the system may also include at least one first set screw carried by the first lateral arm to be screwed into contact with the first solar panel, and at least one second set screw carried by the second lateral arm to be screwed into contact with the second solar panel. In addition, bottom surfaces of the first and second lateral arms may be serrated.

In accordance with one example embodiment, one or more grounding wires may be coupled between at least some of the panel mounting brackets. Furthermore, the distal end of the vertical extension may have a fastener channel therein, and a respective fastener may be used to couple the proximal end of each interior mounting clamp to the distal end of the vertical extension.

In one example implementation, the system may also include a plurality of end mounting clamps to couple an outer edge of solar panels on a periphery of the plurality of solar panels to the distal ends of the vertical extensions of respective panel mounting brackets. By way of example, each end mounting clamp may include a bottom flange, a top flange spaced apart from the bottom flange and partially overhanging the bottom flange and defining a slot therebetween to receive the outer edge of the respective solar panel with the top flange to be connected to the distal end of the vertical extension of the respective panel mounting bracket, and an end extension coupling respective ends of the bottom flange and top flange together.

In accordance with an example embodiment, each panel mounting bracket and each interior mounting bracket may comprise aluminum. Furthermore, the base may have a plurality of mounting holes on opposing sides of the vertical extension.

A related mounting clamp for use with a panel mounting bracket, such as those described briefly above, is also provided. Moreover, a related method for mounting a plurality of solar panels on a building may include positioning a plurality of panel mounting brackets on the building, such as those described briefly above. The method may also include positioning a first solar panel on a given panel mounting bracket, and coupling an interior mounting clamp to the given panel mounting bracket. The interior mounting clamp may include a leg having a proximal end to be coupled to the distal end of the vertical extension of the given panel mounting bracket and a distal end, a first lateral arm coupled to the distal end of the leg on a first side thereof for securing a first solar panel to the given panel mounting bracket, with the first lateral arm having a bottom surface, and a second lateral arm coupled to the distal end of the leg on a second side thereof opposite the first side for securing a second solar panel to the given panel mounting bracket, with the second lateral arm having a bottom surface positioned vertically above the bottom surface of the first lateral arm along the leg. The method may further include positioning a second solar panel on the given panel mounting bracket beneath the second lateral arm.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Referring initially to FIGS. 1-8, an assembly 30 for mounting one or more solar panels 31 on a building (e.g., on a roof) is first described. The assembly 30 illustratively includes a mounting bracket 32 (which is also referred to as a "foot" herein) for installing solar panels or modules 31. By way of background, solar modules or panels are typically mounted to racking using clamps that grip the module and hold it tight to rails which are mounted to rooftops by "L" shaped feet. The foot 32 illustrated in FIG. 1 advantageously avoids the need for such rails and clamps by mounting panels to roofs through the use of multiple feet (e.g., four feet, although other numbers of feet may be used), which are attached to the underside of each panel. More particularly, each panel 31 may include an outer frame 33 defining a lip 34 on the underside thereof, and in the example embodiment illustrated in FIGS. 7 and 8 the outer frame carries a photovoltaic cell array 35 therein (although the assembly 30 may also be used for mounting solar hot water heating panels as well, for example).

Figure 1:
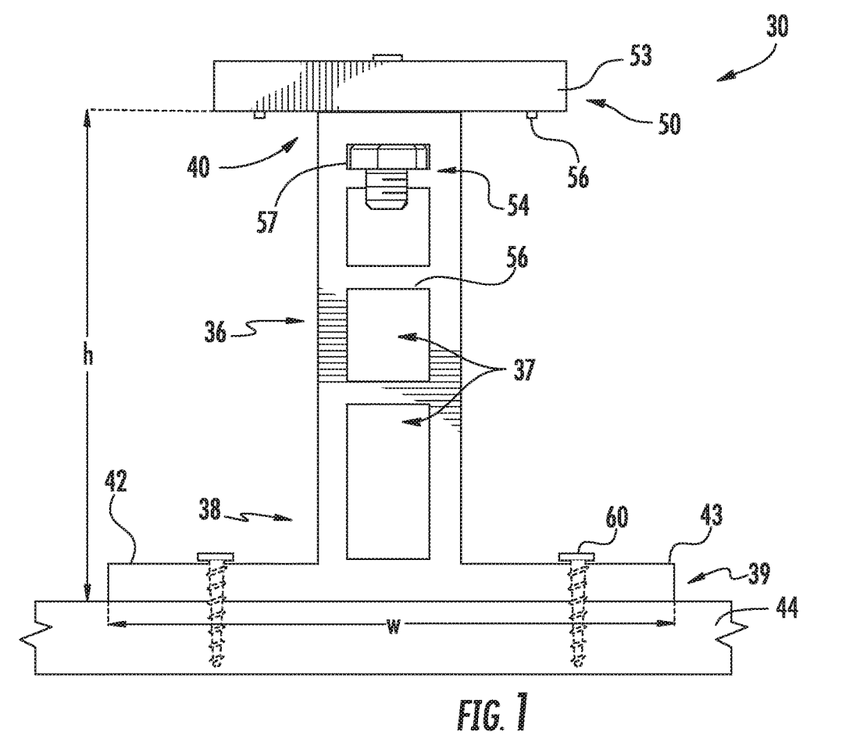
FIG. 1 is an end view of a panel mounting bracket in accordance with an exemplary embodiment of the invention including an under-mounting clamp.

In the illustrated example, the foot 32 has a generally rectangular-shaped central vertical extension portion 36 with one or more hollow central area(s) or channel(s) 37 therethrough. A proximal end 38 of the vertical extension 36 is coupled to a flange or base 39 of the foot 32, and a distal end 40 of the vertical extension is vertically spaced apart from the proximal end, as seen in FIG. 1. An upper fastener channel slot or groove 41 is defined in the distal end 40 (see FIG. 2), though grooves may instead or in addition be provided on either or both sides of the vertical extension 36 in some embodiments, if desired. The foot 32 has a height h and a width w, which in an example embodiment may both be three inches, but other dimensions may also be used in different embodiments.

The base 39 illustratively includes two side extensions 42, 43 that extend outwardly away from the vertical extension 36 so that the vertical extension is centered on the base (although it need not be centered in all embodiments). Thus, when the bottom surface of the base 39 sits flat on a rooftop or roof deck 44 upon installation, the vertical extension 36 points upward or normal to the surface of the roof (although the vertical extension may form different angles with respect to the base besides 90° in different embodiments). Serrations or other surface features may optionally be included on portions of the upper surface of the distal end 40 and/or the bottom surface of the base 39, if desired. The serrations may advantageously provide for improved electrical grounding with the frame of the panel, as well as increased grip or friction, for example, as will be appreciated by those skilled in the art.

Figure 4:
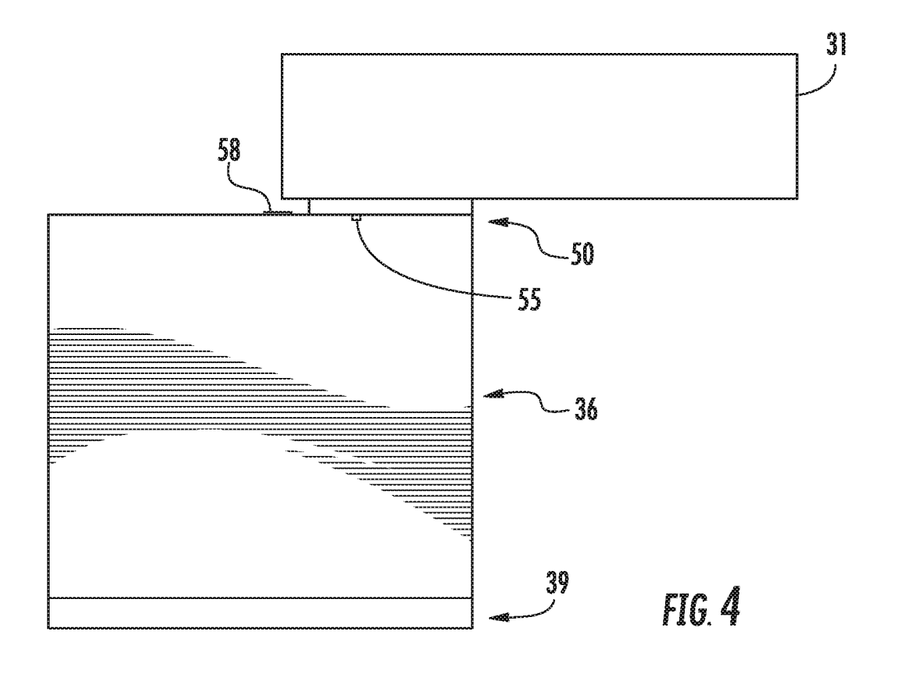
FIG. 4 is a side view of a mounting bracket attached to the frame of the underside of a panel at the perimeter of a panel array.
Figure 5:
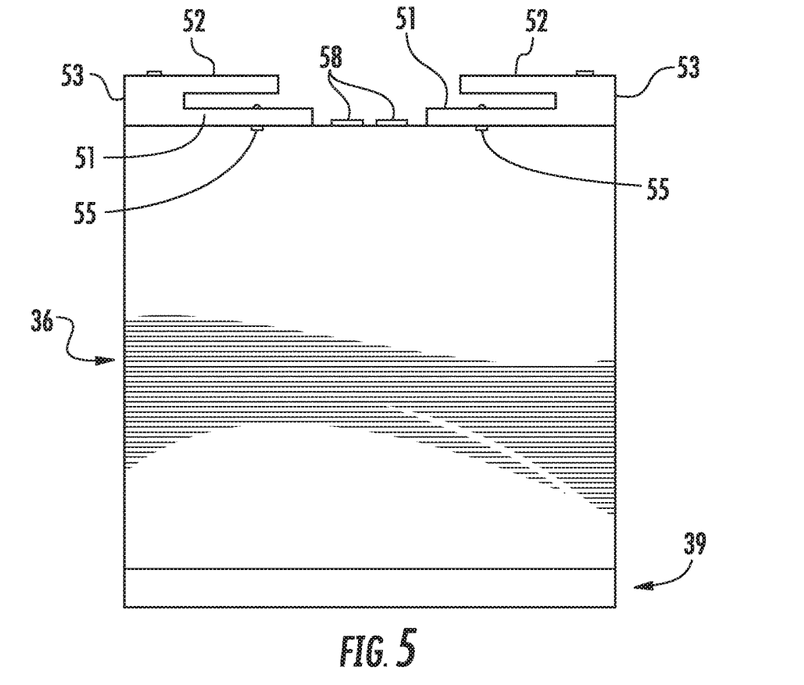
FIG. 5 is a side view of a mounting bracket with two mounting clamps for attaching to respective frames of two adjacent modules.
Figure 6:
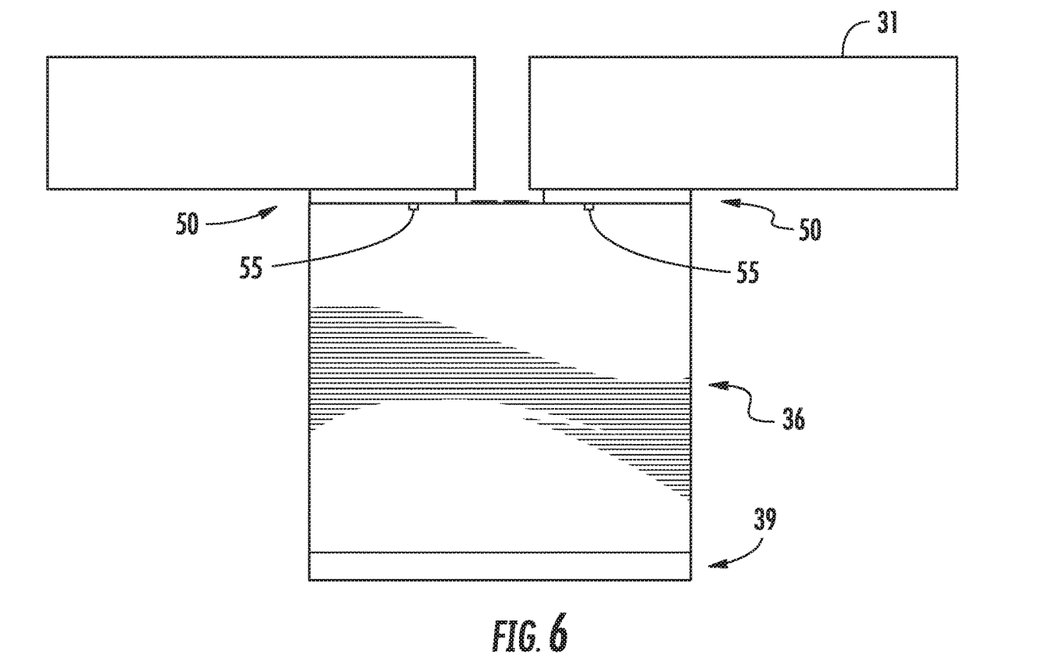
FIG. 6 is an end view of a mounting bracket with two mounting clamps respectively connected to two adjacent modules.
Figure 7:
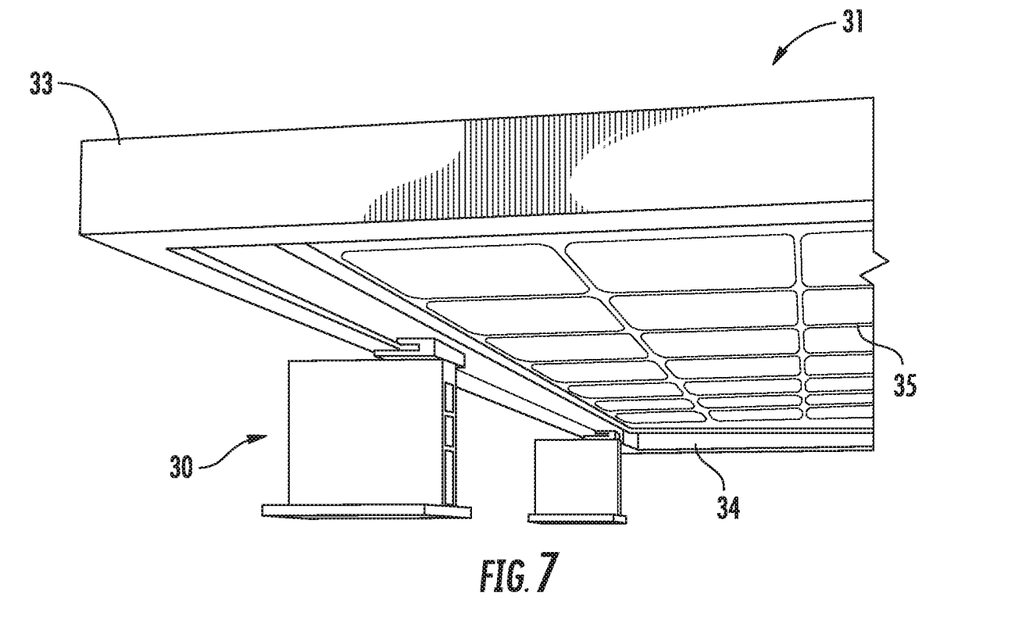
FIG. 7 is a three-dimensional perspective view of a pair of mounting brackets as shown in FIG. 4 each having a respective mounting clamp coupled to a same panel.
Figure 8:
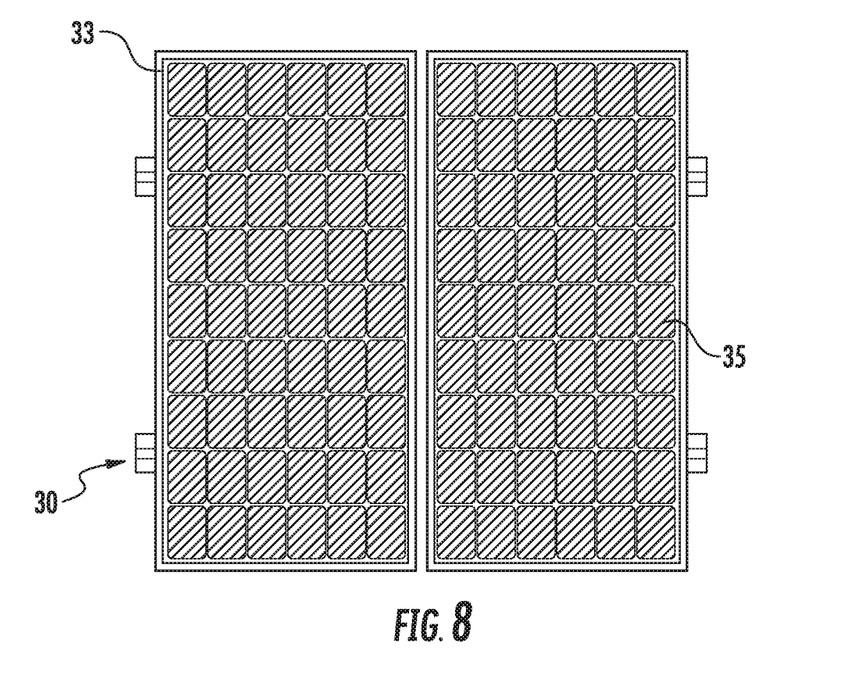
FIG. 8 is a top view of two panels as they would appear installed on a rooftop using a plurality of the bracket assemblies illustrated in FIGS. 4 and 6.

In the illustrated example, the feet 32 are attached to the underside lip 34 of each panel frame 33, as shown in FIGS. 4 and 7. While still on the ground, the installation technician may advantageously attach the feet 32 to the bottom of each panel on their longer sides (e.g., top and bottom sides) with the front edge of the foot facing out from the panel using an under-mounting clamp 50. However, the feet 32 may be attached to the other sides of the panels 31 as well in some embodiments, and the panels may also be attached to the feet after the feet have been installed on the rooftop 44, if desired.

The mounting clamp 50 illustratively includes a bottom flange 51, a top flange 52 spaced apart from the bottom flange and partially overhanging the bottom flange (see FIG. 3) to define a slot therebetween, and an end extension 53 coupling respective ends of the bottom flange and top flange together. The slot is configured to engage or receive the lip 34 of the solar panel 31 on the outside edges of the solar panels at the end of each row of panels, as seen in FIG. 7. The mounting clamp 50 further illustratively includes a fastener channel connector 54 coupled to the bottom flange 51 and configured to be slidably received within the fastener channel 41.

Figure 2:
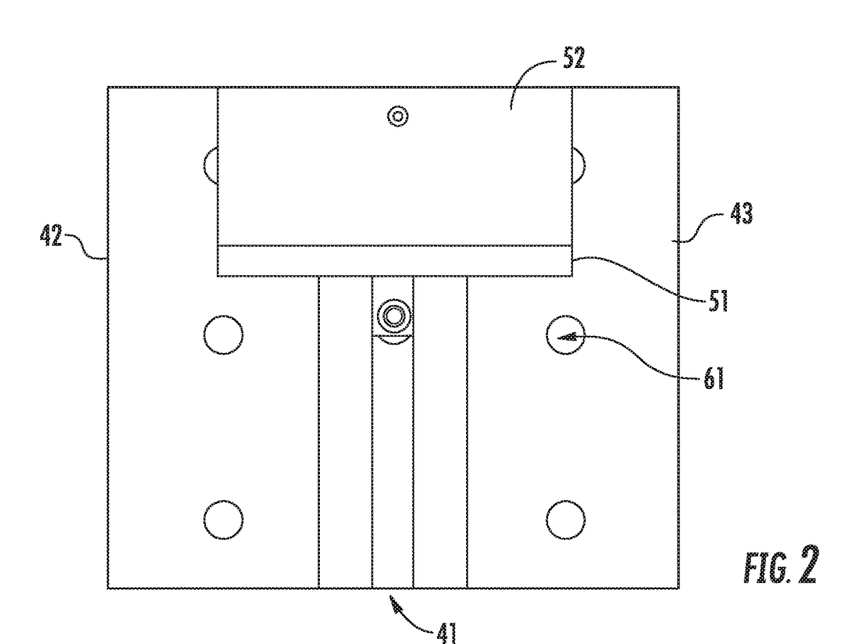
FIG. 2 is a top view of the mounting bracket of FIG. 1 with mounting holes for securing the bracket to a structure.
Figure 3:
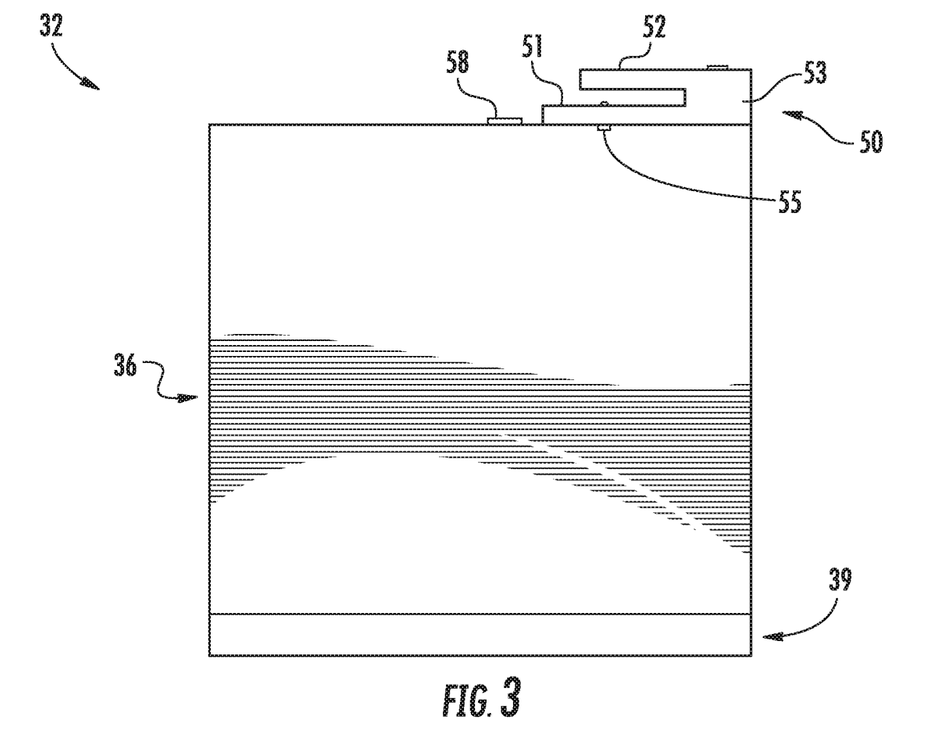
FIG. 3 is a side view of the mounting bracket with a single mounting clamp for attaching to the exterior sides of panels located at the perimeter of a panel array.

In the present example, the fastener channel connector 54 illustratively includes a T-shaped connector or slide bar coupled to the bottom flange 51 on a side thereof opposite the top flange 52 (i.e., on its bottom side). The T-shaped connector 57 is configured to be slidably received within the fastener channel 41, as seen in FIGS. 1 and 2. The fastener channel connector 54 may first be attached to the solar panel 31, and then the feet 32 connected to respective mounting clamps 50. Another approach is that the mounting clamps 50 may be coupled to respective feet 32, and the entire assembly 30 (i.e., mounting clamp plus foot) may then be connected to the solar panel 31. The mounting clamp 50 further illustratively includes a retaining set screw(s) 55 which may be tightened to secure the lip 34 within the slot between the bottom and top flanges 51, 52, and a slide bar retaining bolt 58 and a corresponding nut 59. The set screws 55 may also advantageously facilitate an electrical grounding connection with the foot 32, as will be discussed further below.

A first column of panels 31 may then be attached on the roof 44 with deck screws 60 through mounting holes 61 in the side extensions 42, 43 on the outward or perimeter side of the array, typically in a straight line. In some instances, a sealant may be used under each foot 32, if desired. Various types of sealant may be used, such as caulking, tar, Butyl tape, etc. An adjacent column of solar panels 31 may then be attached with additional feet 32 adjacent to the first column of solar panels so as to share the second set of feet (see FIGS. 5 and 6) between them. That is, the fastener channel 41 of each vertical extension portion may be of sufficient dimensions or length to slidably receive two (or more) fastener channel connectors 54 therein. While the feet 32 are shared between adjacent panels, the mounting clamps 50 retain each solar panel 31 independently. This allows each solar panel 31 to be installed and secured individually, and in the event that a solar panel is to be removed from an array, this can be done independently without loosening the adjacent solar panel, which is generally not possible with typical panel or panel mounting arrangements.

The installation process may be repeated for each column of solar panels 31 to be installed, until the last column of solar panels is reached. On the outer perimeter of the last solar panel 31, one mounting clamp 50 may be used per foot 32 to attach to the outer edge of each of the perimeter solar panels (see, e.g., FIGS. 4 and 7).

A significant advantage of the assembly 30 is that it may advantageously be connected or coupled to a respective solar panel 31 on the ground, rather than having to be coupled to the solar panel on the roof 44 where this is more difficult (and potentially more dangerous), and where it is much harder to recover dropped tools, screws, nuts, washers, or other parts. Moreover, this may also help expedite the installation process.

The hollow channels or passageways 37 in the vertical extension 36 may serve as wire management channels, which may be used for keeping electrical transmission wires (e.g., for PV panels) or temperature sensor wires (e.g., for a water heater panels) secured in place. However, the cross-support members 56 which define the channels 37 need not be included in all embodiments, although even when the channels are not used for routing wires the cross-support members may provide added rigidity and/or stability to the feet 32. It should also be noted that the vertical extension 36 of the foot 32 need not be hollow in all embodiments, and that different shapes beside a rectangular shape may also be used for the base 39 and/or the vertical extension in some embodiments. One example material for the foot 32 and the mounting clamp 50 is aluminum, which may be extruded into the desired shape, although other suitable materials may also be used in different embodiments. The various screws and fasteners described herein may be stainless steel, brass, galvanized steel, etc.

Here again, a sealant may optionally be used under each foot 32 so that the screws 60 are screwed through the foot 32 and sealant into the roof or decking 44 at desired locations. By way of example, two or more feet 32 may be secured to the roof 44 to receive one side of the panel, i.e., two (or more) feet are used on each of the top and bottom sides or edges of the solar panel 31, as shown in FIG. 7, although in some embodiments a single foot may be used.

It should be noted that the above-described mounting assembly 30 may be used with a variety of roof types, including flat and sloped roofs, and over different types of roof coverings (e.g., shingles, tiles, panels, etc.). Moreover, the mounting feet may be used for installations other than on rooftops, such as where mounting to the side of a building or other structure is required.

Turning to FIGS. 9-15, another example clamp 60 which may be used with the mounting bracket 32 is now described. Generally speaking, the clamp 60 is an interior mounting clamp in that it may be used between two adjacent solar panels 31 to couple them both to the same mounting bracket 32 (similar to the configuration shown in FIG. 6), as opposed to an end clamp which is only connected to the outer edge of panels on the periphery of a panel array (see FIG. 4). The interior mounting clamp 60 may in this respect also be referred to as a "mid clamp" herein, as it is suited for connection in the middle between two adjacent solar panels 31 on a given bracket 32.

Figure 9:
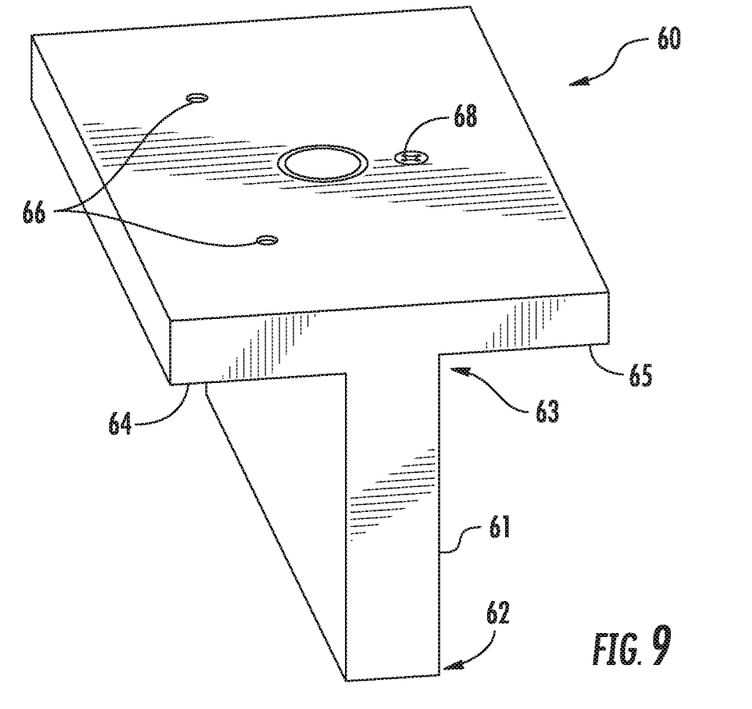
FIG. 9 is a perspective view of an intermediate mounting clamp which may be used in a solar panel mounting system in accordance with another example embodiment.
Figure 10:
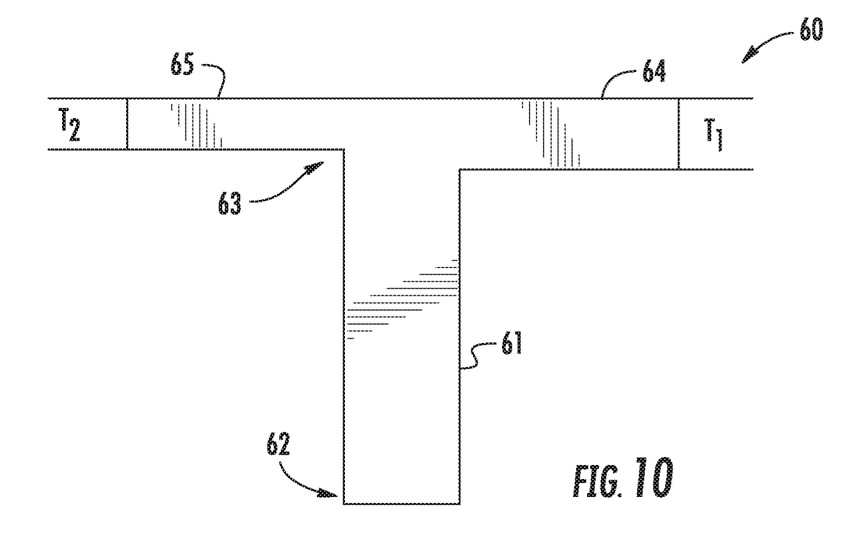
FIG. 10 is a side view of the mounting clamp of FIG. 9.
Figure 11:
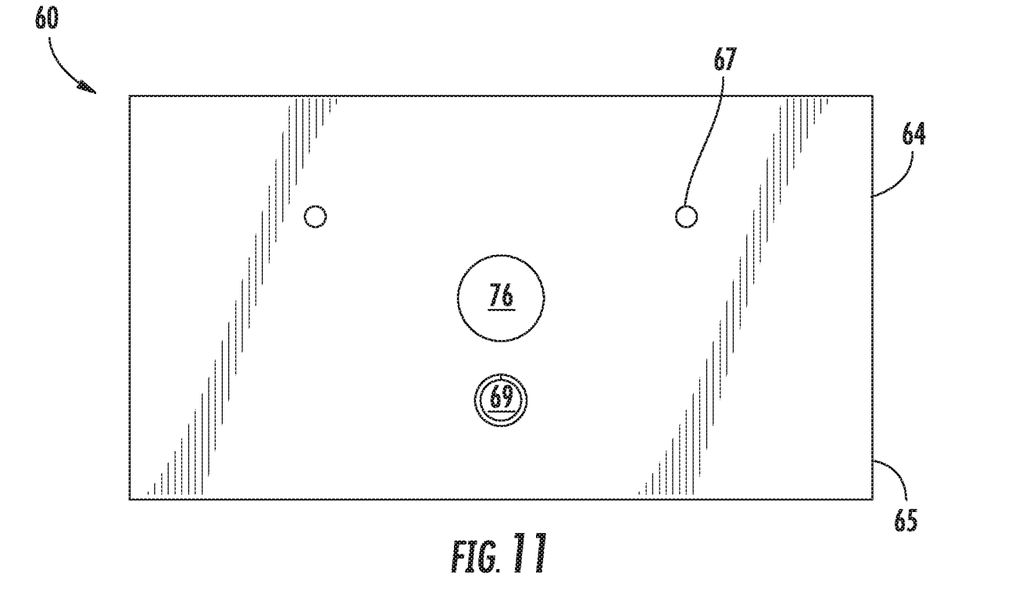
FIG. 11 is a top view of the mounting clamp of FIG. 9.
Figure 12:
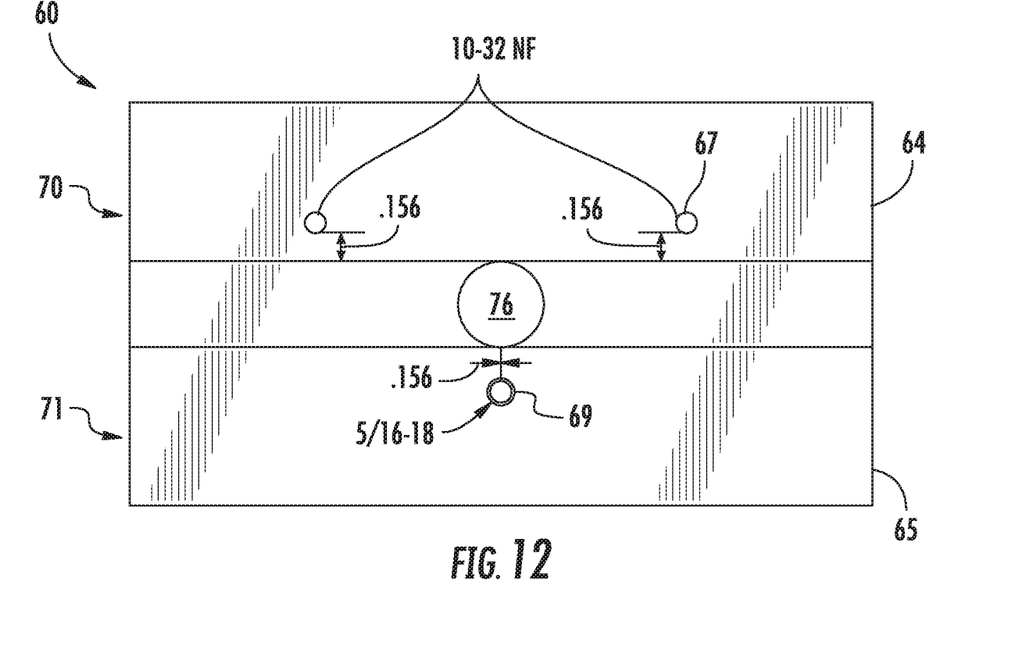
FIG. 12 is a bottom view of the mounting clamp of FIG. 9.

In the illustrated example, the mid clamp 60 has the basic profile of an upright "T", with a leg 61 having a proximal end 62 to be coupled to the distal end 38 of the vertical extension 36 of a given panel mounting bracket 32, and a distal end 63. Each mid clamp 60 also illustratively includes a first lateral arm. 64 coupled to the distal end 63 of the leg 61 on a first side thereof for securing a first solar panel 31 to a panel mounting bracket 32, and a second lateral arm 65 coupled to the distal end of the leg on a second side thereof opposite the first side for securing a second solar panel to the same panel mounting bracket. It should be noted the in the illustrated example, the arms 64, 65 are straight and extend perpendicularly out from the leg 61, but that the arms may take other shapes (e.g., curves or arcs) and extend outward at other angles as well.

Furthermore, the first lateral arm 64 has a first thickness $T_1$, while the second lateral arm 65 has a second thickness $T_2$ less than the first thickness. Considered alternatively, the second lateral arm 65 is thinner than the first lateral arm 65. This advantageously allows a first solar panel 31 to be installed and tightened in place beneath the first lateral arm 64 before the next adjacent solar panel is installed, to provide enhanced flexibility in installation as well as helping to prevent movement or shifting of the modules in a row during the installation process, as will be discussed further below.

By way of example, the second thickness $T_2$ may be in a range of about 60% to 80% of the first thickness $T_1$. In accordance with one example implementation, the bracket 32 may be 3" long and 3⅜" wide, and the mid clamp 60 may be 1½" tall and 1½" wide, with a width of the leg of ¼", although other dimensions may be used in different embodiments. In an example embodiment, the first thickness $T_1$ may be 0.25 inches, while the second thickness $T_2$ may be in a range of 0.156-0.1875 inches, although here again other thicknesses may be used in different embodiments. Because of the reduced second thickness $T_2$ relative to the first thickness $T_1$, a second solar panel 31 advantageously may be slid underneath the second lateral arm 65 after the mid clamp 60 is already in place over the first solar panel, which would not be possible if the two arms were of the same thickness.

The mid clamps 60 may advantageously be used to attach the solar panels 31 to the panel mounting brackets 32 (or other suitable brackets or rails in different embodiments) independent to the installation of subsequent mounts. This means that each panel 31 may be tightened and secured before the next adjacent panel is installed, allowing the installer to install each panel exactly where he or she wants it to be secured. This helps to eliminate movement or shifting of panels 31, which often occurs as installers are positioning the next panel or module of a series of modules in a row, and therefore helps insure straighter and more efficient installs.

Furthermore, a pair of first set screws 66 (e.g., 10-32 stainless sharp point set screws) is carried by the first lateral arm 64 in holes 67 to be screwed into contact with the first solar panel 31, and a second set screw 67 (e.g., 5/16-18 cup point screws) is carried by the second lateral arm 65 to be screwed into contact with the second solar panel, as will be discussed further below. In addition, bottom surfaces 70, 71 of the first and second lateral arms 64, 65 may be serrated, scored, or otherwise textured, if desired (see FIG. 12). This may advantageously help provide enhanced grip as well as electrical grounding.

Figure 13:
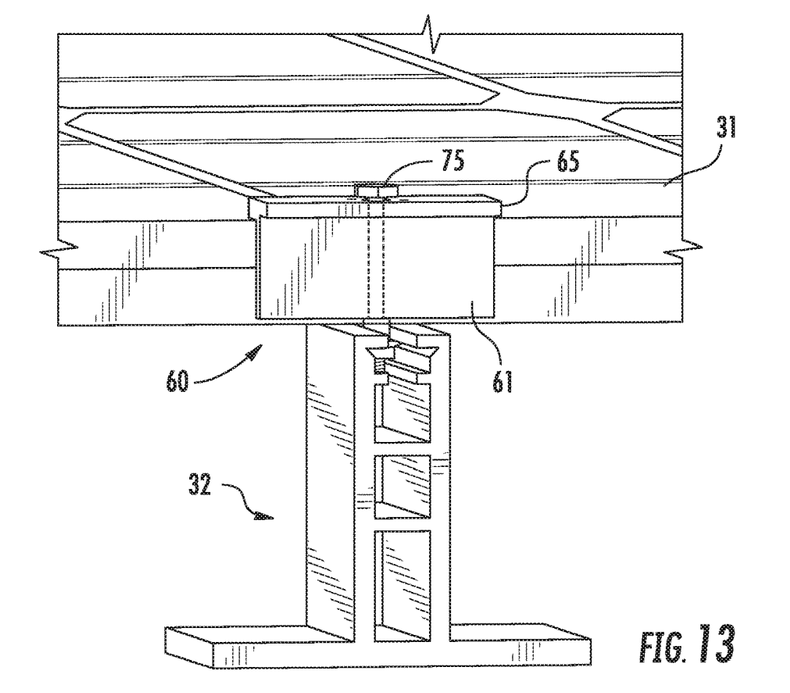
FIGS. 13-15 are perspective views illustrating attachment of the intermediate mounting clamp of FIG. 9 to the panel mounting bracket of FIG. 1.
Figure 14:
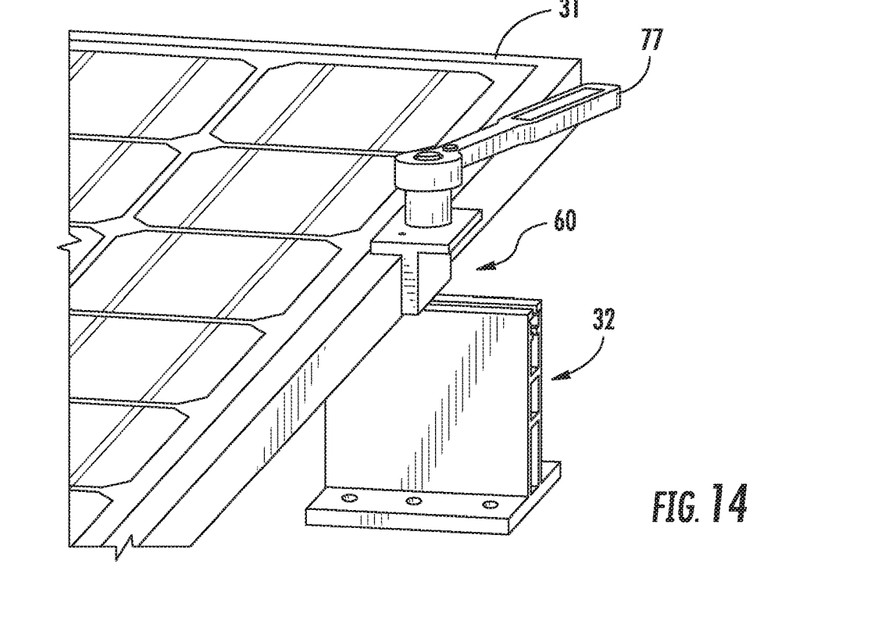
Figure 15:
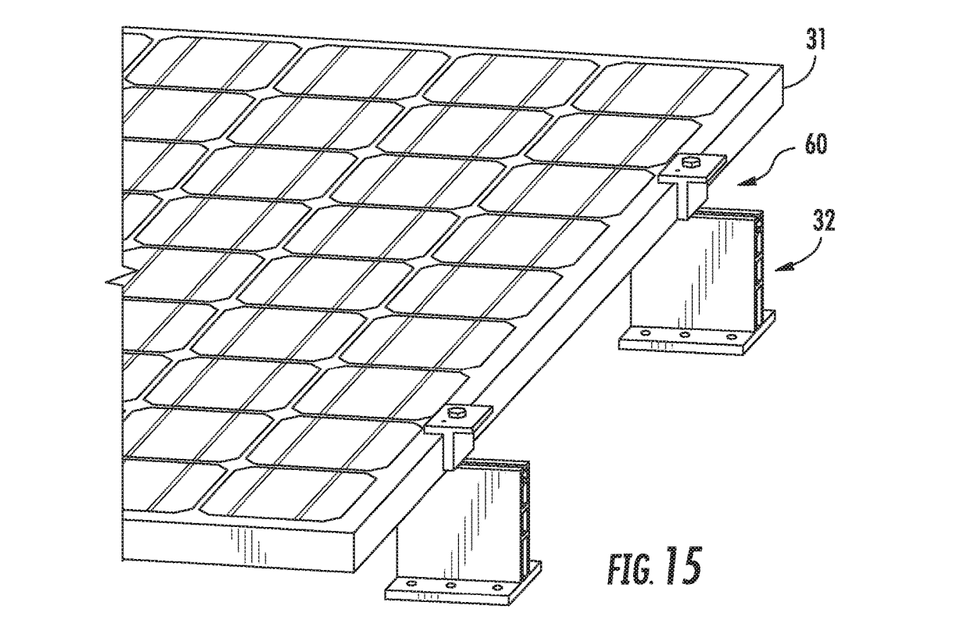

As described above, the distal end 40 of the vertical extension 36 has a fastener channel 41 therein. A respective fastener 75 (e.g., a bolt and nut, as shown in FIG. 13) may be used to couple the proximal end 62 of each mid clamp 60 to the distal end 40 of the vertical extension 36 through a hole 76 extending vertically through the leg 61, as will be discussed further below.

The mid clamp 60 may also have integrated bonding to meet the applicable bonding requirements (such as UL 2703), and thereby eliminate running mechanical grounding leads from panel to panel. The mid clamp 60 may accordingly help reduce costly time on the roof, as well as added expense of extra grounding wire and lay in lugs.

An example approach for installing the system 30 using the mid clamps 60 on a roof 90 is now described. As noted above, the panel mounting brackets 32 may be sealed using either butyl tape or other suitable sealant. By way of example, when using a sealant, the installer may add a liberal amount to the bottom of each bracket 32 just prior to attaching them to the roof. When using butyl tape, an assistant on the ground may prepare the brackets 32 ahead of time by pre-applying the tape, for example.

The installer marks the location of the first panel 31 on the roof and measures over from the edge of the first module the width of the module (e.g., 39⅛") plus ⅜" (i.e., 39½"). A mark may be made opposite the location of the first mounting feet 32. The perimeter edge mounting feet 32 may be secured to the outside marks with four #10 deck screws, for example.

Next, the mid clamps 60 with bolts and kept nuts through the top groove 41 of each of the mounting feet 32 opposite the outside edge of the panel 31. The bolts may be tightened so the first lateral arm 64 is snug to the first panel 31, and the panel secured with the two set screws 66 tightened against the panel. By way of example, the fastener 75 of each mid clamp 60 may be tightened to 10 ft.-lbs. with a torque wrench 77 so that the two sharp-point set screws 66 bite into the frame of the panel 31, piercing the anodized coating and securing the panel tight against the mounting feet 32 (see FIGS. 14 and 15).

Figure 16:
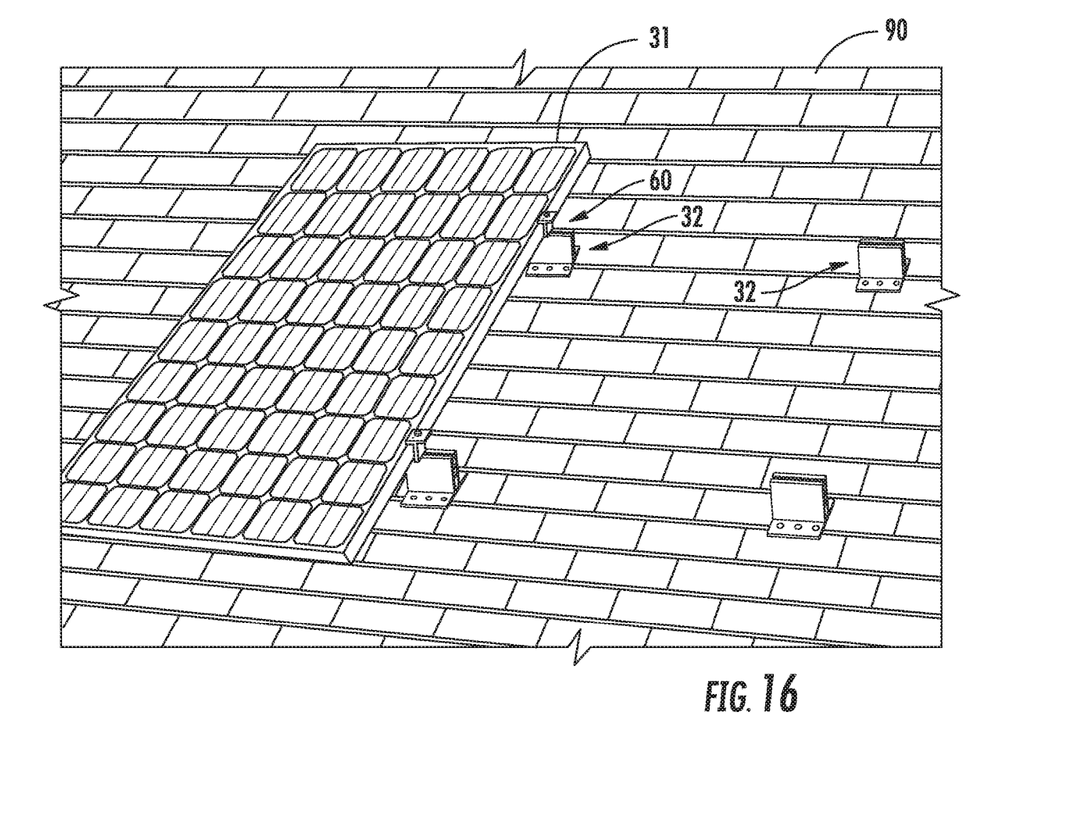
FIGS. 16-20 are perspective views illustrating installation and removal of a solar panel array using the panel mounting brackets and mounting clamps described herein in accordance with an example embodiment.
Figure 17:
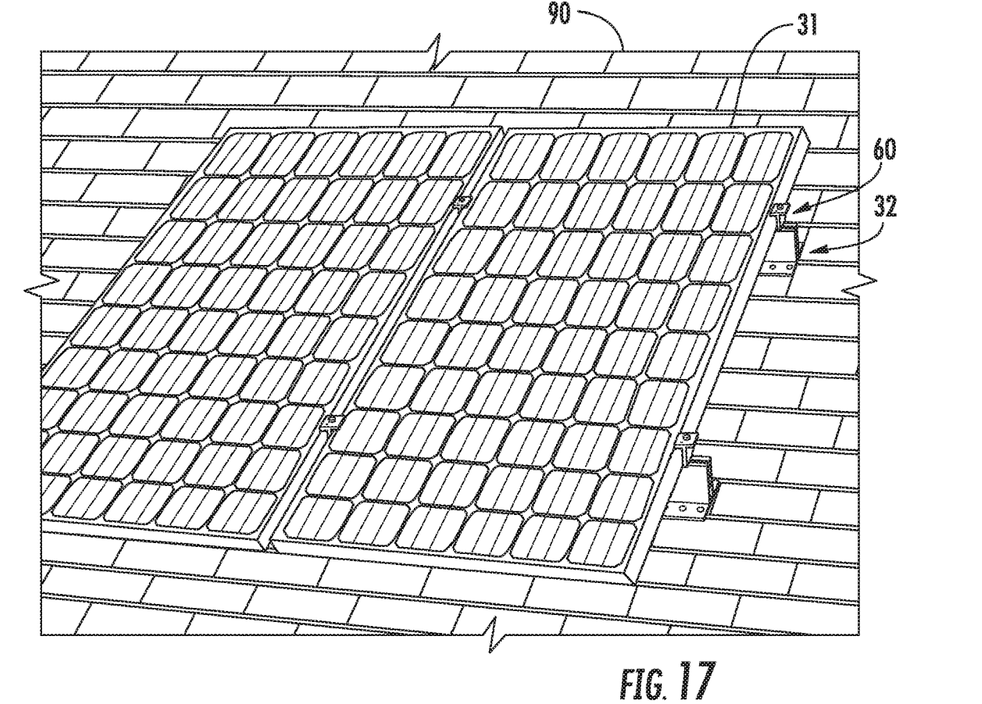

In a next step, the installer may measure over from the frame of the first panel 31 the width of the panel plus ⅜" (i.e., 39½) and make another mark for each of the next feet 32 (FIG. 16), although other dimensions may be used in different embodiments. The next set of mounting feet 32 may be centered over the marks and sealed with sealant or butyl tape, and secured with four #10 screws (or other suitable screw) for each location (FIG. 16). Then, a next panel 31 may be set on the four mounting feet 32 by sliding it under the second lateral arms 65 of the first set of mid clamps 60, and the second panel may be secured with the mid clamps along the outside leading edge similar to the first panel (FIG. 17).

Figure 18:
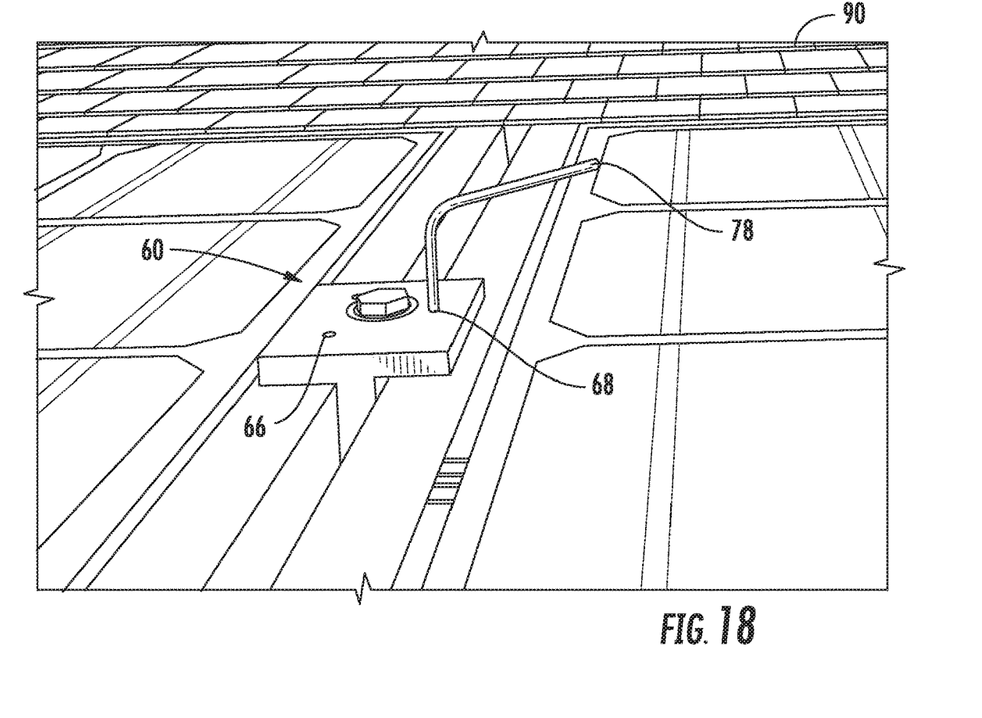

Next, the set screw 67 from the mid clamps 60 of the leading edge of the first panel 31 may be tightened into the trailing edge of the second panel by turning it clockwise one full turn so that it bites through the anodized coating on the module (FIG. 18), e.g., with an Allen wrench 78. This action helps secure the second panel 31 as well as bond it electrically to the first panel. The process may then continue with each subsequent panel 31 following the steps described above until the final panel. For the final panel 31, the above steps are followed after securing the final two clamps (which may be end clamps 50 or mid clamps 60) to the outer frame edge to secure the outside edge of the final panel.

Figure 19:
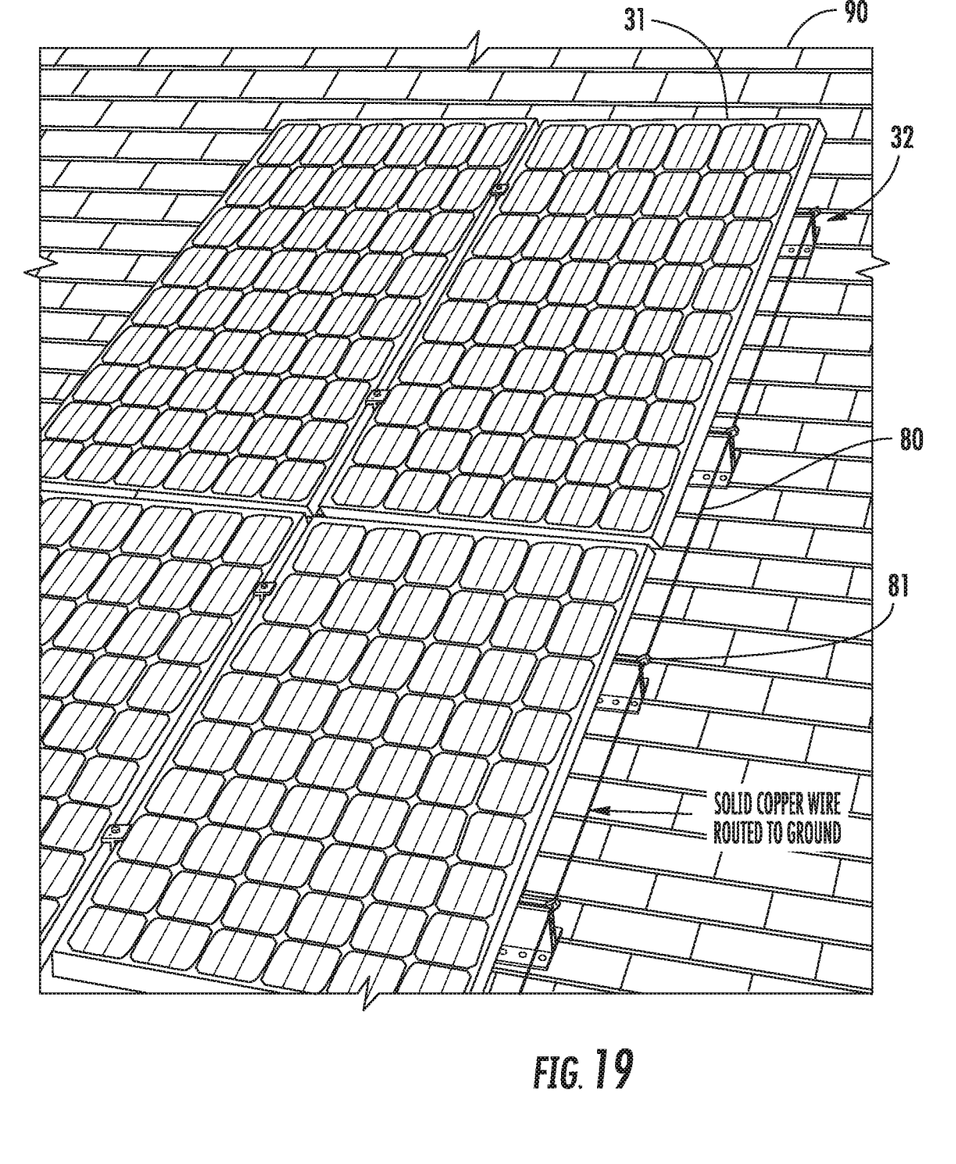

Electrical grounding connections between rows of feet 32 may be accomplished by running a wire 80 (e.g., solid #10 copper wire) from one row to the next, as shown in FIG. 19. By way of example, lugs 81 (such as Ilsco SGB-4 lay in grounding lugs 81 or other suitable lugs) may be coupled through the top slot of one mounting foot 32 and connected to each end panel per row.

Figure 20:
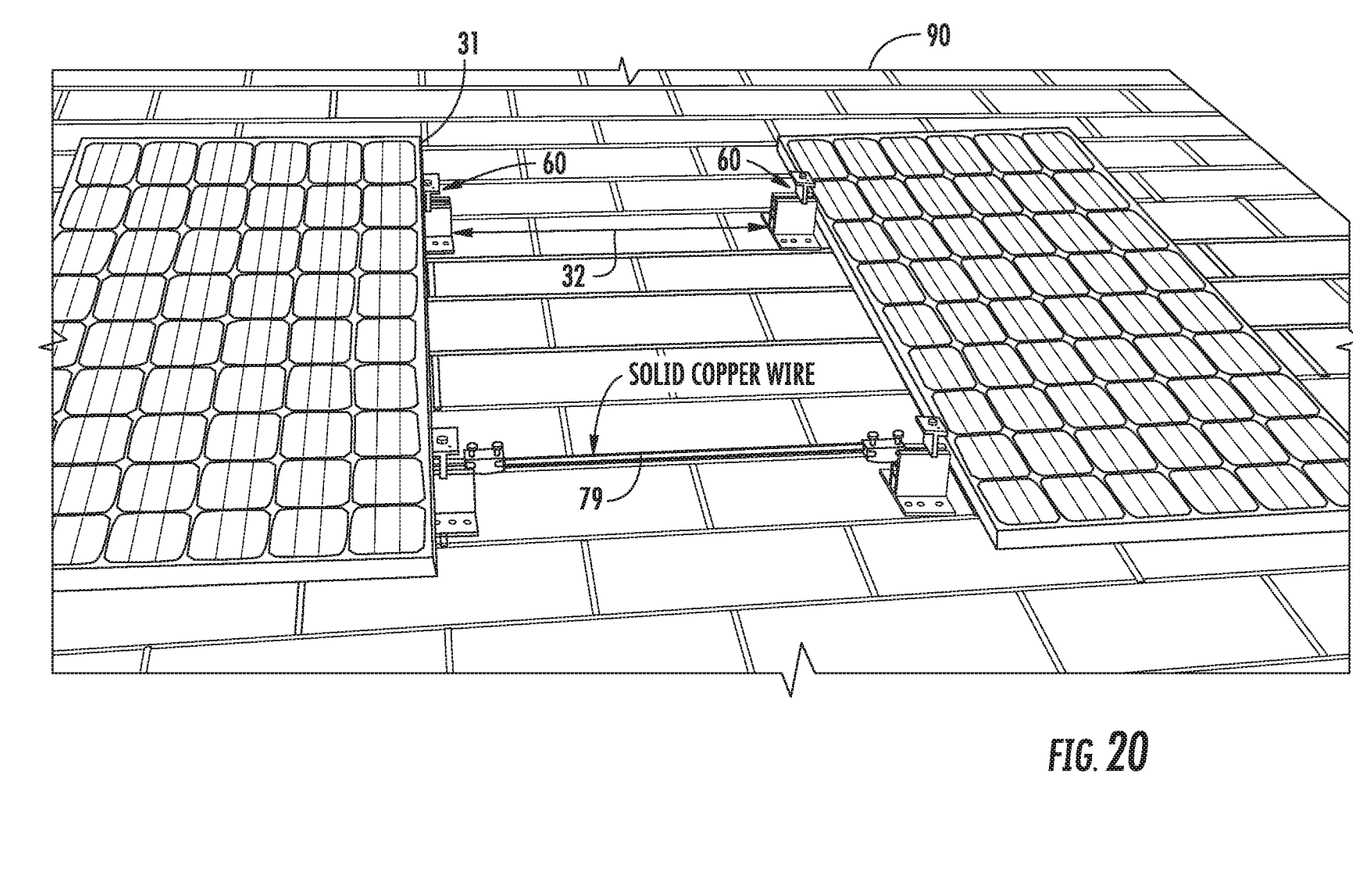

In the event that a panel 31 needs to be removed from the array, the mid clamp 60 allows this to be relatively easily accomplished without having to remove other panels in the array. First, the electrical leads should be disconnected from the panel 31 to be removed and the adjacent panels in compliance with the applicable solar module manufacturer's guidelines. The mid clamps 60 may then be loosened and removed from the leading edge of the panel 31 to be removed. This is the edge which has the two set screws 66 of each mid clamp 60 secured to it. The mid clamps 60 removed in the previous step may then be turned 180 degrees and reinstalled, insuring the two set screws 66 on each clamp 60 are facing toward the opposite panel 31 being secured. The fastener 75 may then be tightened to 10 ft.-lbs. of torque (or other suitable value for the given fastener). A conductor 79 (e.g., solid copper wire) may optionally be secured between one set of mounting feet 32 per module using lugs such as those described above (FIG. 20) so that there is not a break in the electrical grounding circuit.

As such, it will be appreciated that the mid clamp 60 advantageously provides for integrated bonding to facilitate electrical grounding between adjacent panels 31 in a same row, yet without the necessity for running a separate grounding wire between them. Instead, grounding wires may simply be run between mounting brackets in different rows, as described above, to advantageously simplify and expedite the installation process.

It should be noted that the various dimensions provided herein are exemplary, and that other dimensions and sizes may be used in different embodiments. It should also be noted that the mid clamp 60 may also be used with a variety of different mounting brackets or assemblies, and not just the mounting bracket 32.

Many modifications and other embodiments of the invention will come to the mind of one skilled in the art having the benefit of the teachings presented in the foregoing descriptions and the associated drawings, which are provided by way of example. Therefore, it is understood that the disclosure is not to be limited to the specific embodiments disclosed, and that other modifications and embodiments are intended to be included within the scope of the appended claims.

That which is claimed is:

1. A system for mounting a plurality of solar panels on a building and comprising:
a plurality of panel mounting brackets each comprising
a base to be positioned on the building, and
a vertical extension having a proximal end coupled to the base and a distal end vertically spaced apart from the base, the vertical extension defining a lateral fastener channel to slidably receive a nut; and
a plurality of interior mounting clamps each comprising
a leg having a proximal end and a distal end spaced apart from the proximal end, the leg having an aperture extending therethrough for receiving a bolt to connect with the nut within the lateral fastener channel,
a first lateral arm coupled to the distal end of the leg on a first side thereof for securing a first solar panel to the given panel mounting bracket, the first lateral arm having a bottom surface, and
a second lateral arm coupled to the distal end of the leg on a second side thereof opposite the first side for securing a second solar panel to the given panel mounting bracket, the second lateral arm having bottom surface positioned vertically above the bottom surface of the first lateral arm along the leg.

2. The system of claim 1 further comprising at least one first set screw carried by the first lateral arm to be screwed into contact with the first solar panel, and at least one second set screw carried by the second lateral arm to be screwed into contact with the second solar panel.

3. The system of claim 1 wherein the bottom surfaces of the first and second lateral arms are serrated.

4. The system of claim 1 further comprising at least one grounding wire coupled between at least some of the panel mounting brackets.

5. The system of claim 1 further comprising a plurality of end mounting clamps to couple an outer edge of solar panels on a periphery of the plurality of solar panels to the distal ends of the vertical extensions respective panel mounting brackets.

6. The system of claim 5 wherein each end mounting clamp comprises:
a bottom flange;
a top flange spaced apart from the bottom flange and partially overhanging the bottom flange and defining a slot therebetween to receive the outer edge of the respective solar panel, the top flange to be connected to the distal end of the vertical extension of the respective panel mounting bracket; and
an end extension coupling respective ends of the bottom flange and top flange together.

7. The system of claim 1 wherein each panel mounting bracket and each interior mounting bracket comprises aluminum.

8. The system of claim 1 wherein the base has a plurality of mounting holes on opposing sides of the vertical extension.

9. A mounting clamp for use with a panel mounting bracket for mounting a plurality of solar panels on a building, the panel mounting bracket comprising a base to be positioned on the building and a vertical extension having a proximal end coupled to the base and a distal end vertically spaced apart from the base with the vertical extension defining a lateral fastener channel to slidably receive a nut, the mounting clamp comprising:
a leg having a proximal end and a distal end spaced apart from the proximal end, the leg having an aperture extending therethrough for receiving a bolt to connect with the nut within the lateral fastener channel;
a first lateral arm coupled to the distal end of the leg on a first side thereof for securing a first solar panel to the given panel mounting bracket, the first lateral arm having a bottom surface; and
a second lateral arm coupled to the distal end of the leg on a second side thereof opposite the first side for securing a second solar panel to the given panel mounting bracket, the second lateral arm having a bottom surface positioned vertically above the bottom surface of the first lateral arm along the leg.

10. The mounting clamp of claim 9 further comprising at least one first set screw carried by the first lateral arm to be screwed into contact with the first solar panel, and at least one second set screw carried by the second lateral arm to be screwed into contact with the second solar panel.

11. The mounting clamp of claim 9 wherein bottom surfaces of the first and second lateral arms are serrated.

12. A method for mounting a plurality of solar panels on a building comprising:
positioning a plurality of panel mounting brackets on the building, each panel mounting bracket comprising a base to be positioned on the building and a vertical extension having a proximal end coupled to the base and a distal end vertically spaced apart from the base, the vertical extension defining a lateral fastener channel to slidably receive a nut;
positioning a first solar panel on a given panel mounting bracket;
coupling an interior mounting clamp to the given panel mounting bracket, the interior mounting clamp comprising
a leg having a proximal end and a distal end spaced apart from the proximal end, and an aperture extending through the leg,
a first lateral arm coupled to the distal end of the leg on a first side thereof for securing a first solar panel to the given panel mounting bracket, the first lateral arm having a bottom surface, and
a second lateral arm coupled to the distal end of the leg on a second side thereof opposite the first side for securing a second solar panel to the given panel mounting bracket, the second lateral arm having a bottom surface positioned vertically above the bottom surface of the first lateral arm along the leg; and
positioning a second solar panel on the given panel mounting bracket beneath the second lateral arm;
wherein coupling comprises connecting a bolt through the aperture in the leg with the nut within the lateral fastener channel.

13. The method of claim 12 wherein the interior mounting clamp further comprises at least one first set screw carried by the first lateral arm and at least one second set screw carried by the second lateral arm; and further comprising screwing the at least one first set screw into contact with the first solar panel and the at least one second set screen into contact with the second solar panel.

14. The method of claim 12 further comprising coupling at least one grounding wire between at least some of the panel mounting brackets.

15. The method of claim 12 further comprising coupling an outer edge of solar panels on a periphery of the plurality of solar panels to the distal ends of the vertical extensions of respective panel mounting brackets using a plurality of end mounting clamps.

* * * * *